(12) United States Patent
Huang

(10) Patent No.: US 6,386,703 B1
(45) Date of Patent: May 14, 2002

(54) SUNGLASSES COMBINABLE EASILY AND QUICKLY WITH A PAIR OF NEAR-SIGHT EYEGLASSES

(76) Inventor: Jih-Hsing Huang, P.O. Box 90, Tainan City (TW)

( * ) Notice: Subject to any disclaimer, the term of this patent is extended or adjusted under 35 U.S.C. 154(b) by 0 days.

(21) Appl. No.: 09/796,476

(22) Filed: Mar. 2, 2001

(51) Int. Cl.[7] ................................................. G02C 7/08
(52) U.S. Cl. .......................................... 351/57; 351/47
(58) Field of Search .............................. 351/47, 57, 48, 351/58

(56) References Cited

U.S. PATENT DOCUMENTS

| | | | | |
|---|---|---|---|---|
| 5,412,438 A | * | 5/1995 | Bolle | 351/44 |
| 5,790,230 A | * | 8/1998 | Sved | 351/138 |
| 5,907,384 A | * | 5/1999 | Kirsch et al. | 351/48 |
| 5,929,963 A | * | 7/1999 | McNeal | 351/47 |
| 6,290,354 B1 | * | 9/2001 | Safran | 351/57 |

* cited by examiner

*Primary Examiner*—Huy Mai

(57) ABSTRACT

A pair of sunglasses combinable easily and quickly with a pair of near-sight eyeglasses include a combine member provided on a nose pads of a pair of sunglasses, and plural sidewise holes bored in the combine member. Then a pair of near-sight eyeglasses is combined on the combine member of the sunglasses, having a bridge in an intermediate portion, and plural sidewise projections spaced part on the bridge. In combining the near-sight eyeglasses with the sunglasses, the near-sight eyeglasses are placed in the inner side of the sunglasses, with the sidewise projections inserting in the holes of the combine member. Then the near-sight eyeglasses may be combined with the sunglasses easily, quickly and stably.

1 Claim, 3 Drawing Sheets

SUNGLASSES COMBINABLE EASILY AND QUICKLY WITH A PAIR OF NEAR-SIGHT EYEGLASSES

BACGROUND O THE INVENTION

1. Field of the Invention

This invention relates a pair of sunglasses combinable easily and quickly with a pair of near-sight eyeglasses, particularly to one having a combine member formed on the nose pads of the pair of sunglasses for combining a pair of near-sight eyeglasses with no temples.

2. Description of the Prior Art

If a near-sighted person wears a pair of near-sight eyeglasses and wants to wear a sunglasses to prevent strong sunlight in case of going out, the person cannot wear two pairs of eyeglasses at the same time, as it is the fact now that a pair of sunglasses does not have any combine member for combine a pair of near-sight eyeglasses without two temples.

SUMMARY OF THE INVENTION

The objective of the invention is to offer a pair of sunglasses combinable easily and quickly with a pair of near-sight eyeglasses with no temples so that a wearer may wear both a pair of sunglasses and a pair of near-sight eyeglasses at the same time in strong sunlight.

The feature of the invention is a combine member with plural sidewise holes formed on the nose pads of a pair of sunglasses with no temples, and plural sidewise projections formed on the bridge of a pair of near-sight eyeglasses so that the pair of near-sight eyeglasses with no temples can be combined with an inner side of the sunglasses by means of the sidewise projection fitting in the sidewise holes with easiness and quickness.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
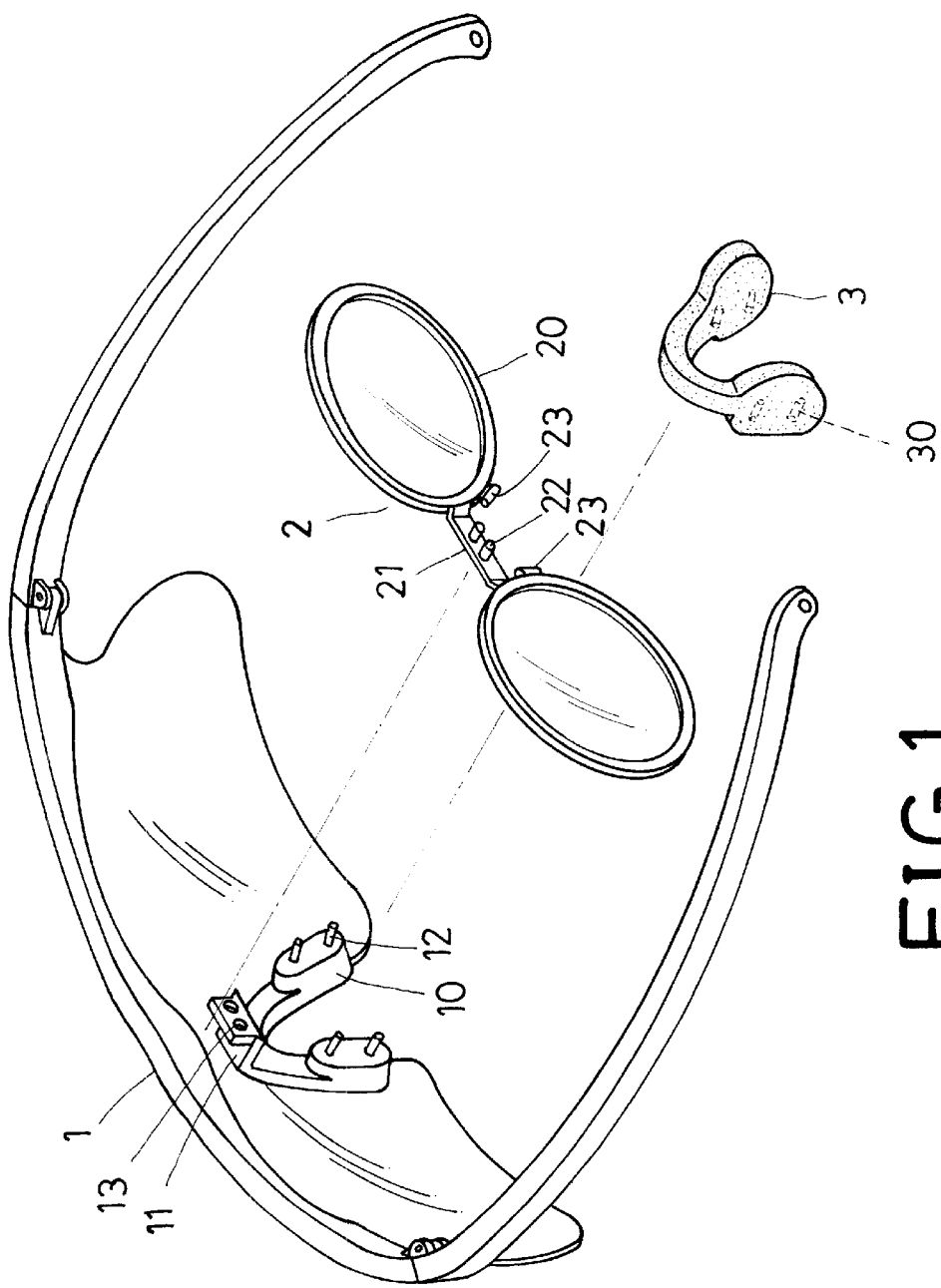
FIG. 1 is an exploded perspective view of a pair of sunglasses combinable easily and quickly with a pair of near-sight eyeglasses in the present invention.

A preferred embodiment of a pair of sunglasses combinable easily and quickly with a pair of near-sight eyeglasses in the present invention, as shown in FIG. 1, includes a pair of sunglasses 1, a pair of near-sight eyeglasses 2 and a nose pad 3 as main components combined together.

The sunglasses includes nose pads 10 in an intermediate portion, a combine member 11 formed to extend upward on an inner edge of the nose pad 10, two combine rods 12 extending sidewise from the two nose pads, and two sidewise holes 13 bored in the combine member 11.

The pair of near-sight eyeglasses 2 is inserted on the combine member 11 of the nose pads 10 of the sunglasses 1, having two lens rims 20 connected with a bridge 21.

The bridge 21 has two sidewise projections 22 spaced apart in an intermediate portion, and a stop block 23 provided on an inner side of each lens rim 20, flush with the lens rims 20.

The nose pads 3 are combined on the nose pads 10 of the sunglasses 1, having respectively a hole 30 in two side portions.

Figure 2:
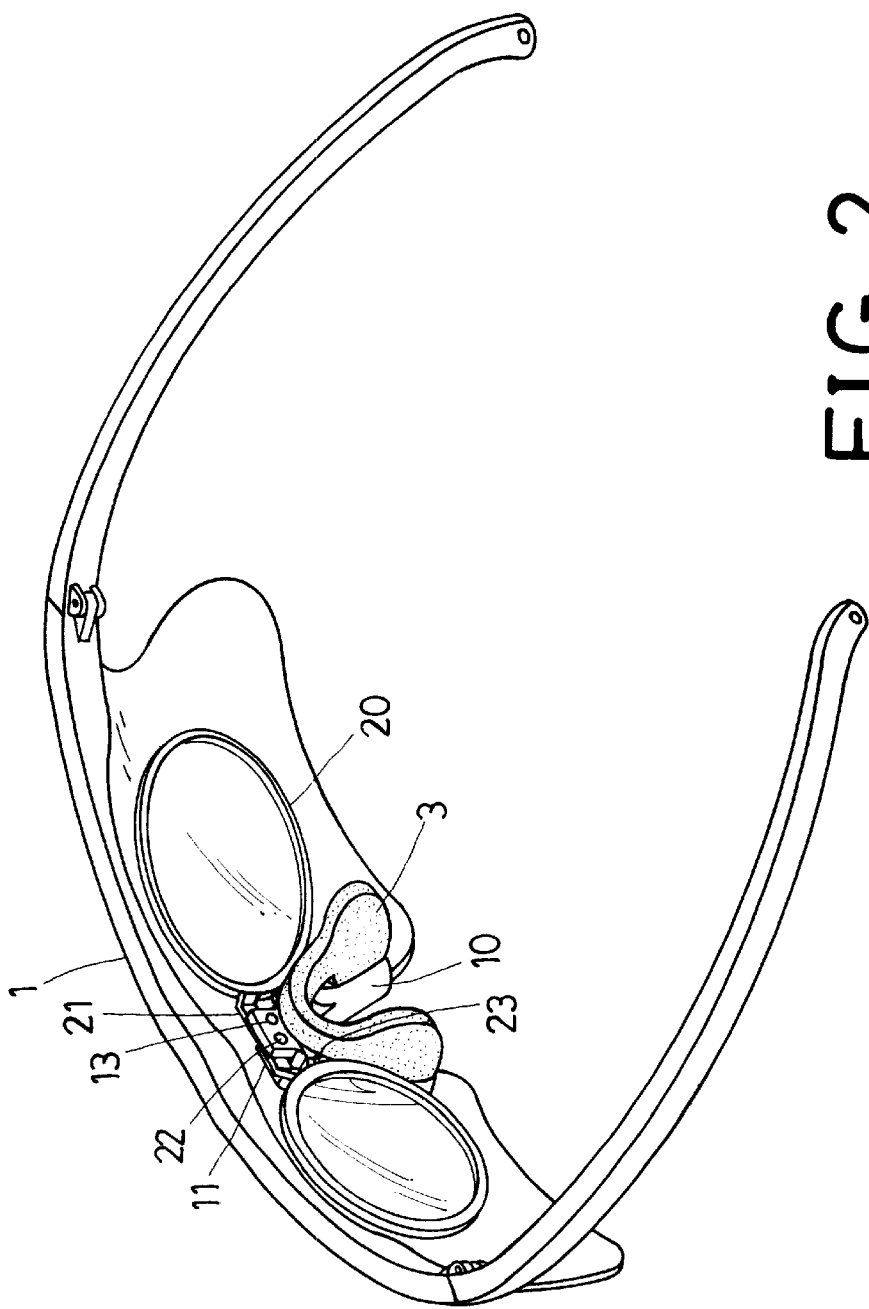
FIG. 2 is a perspective view of the sunglasses combined easily and quickly with a pair of near-sight eyeglasses in the present invention.
Figure 3:
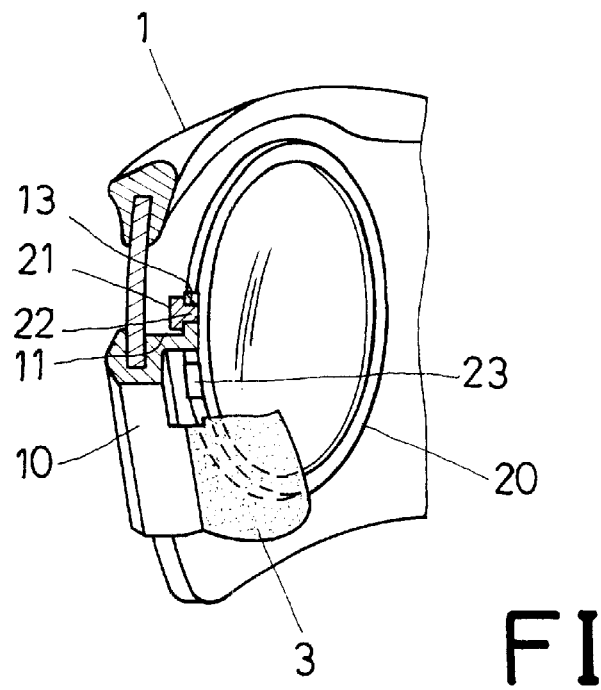
FIG. 3 is a partial cross-sectional view of the sunglasses combined easily and quickly with a pair of near-sight eyeglasses in the present invention; and, FIG. 4 is a cross-sectional view of a combine member of the sunglasses separated from a pair of near-sight eyeglasses in the present invention.

In assembling and using, referring to FIGS. 1, 2 and 3, firstly the pair of near-sight eyeglasses 2 is placed in an inner side of the sunglasses 1, with the bridge 21 of the near-sight eyeglasses 2 supported on the combine member 11 of the nose pads 10 of the sunglasses 1, and then the near-sight eyeglasses 2 are pushed down a bit, letting two sidewise projections 22 of the bridge 20 inserting in the sidewise holes 13 of the combine member 11 and the two lens rims 20 of the near-sight eyeglasses 2 having their outer edge touch the inner edge of the sunglasses 1, with a gap formed between the intermediate portion of the near-sight eyeglasses 2 and the inner surface of the sunglasses 1. Then the near-sight eyeglasses 2 may be elastically kept in the inner side of the sunglasses stably. Lastly, the nose pads 3 are combined on the nose pads 10 of the sunglasses, with the combine rods 12 fitting in the holes 30 of the nose pads 3. Thus the sunglasses 1 are combined with a pair of near-sight eyeglasses 2 completely without need of any tools, very convenient and quick to assemble.

Figure 4:
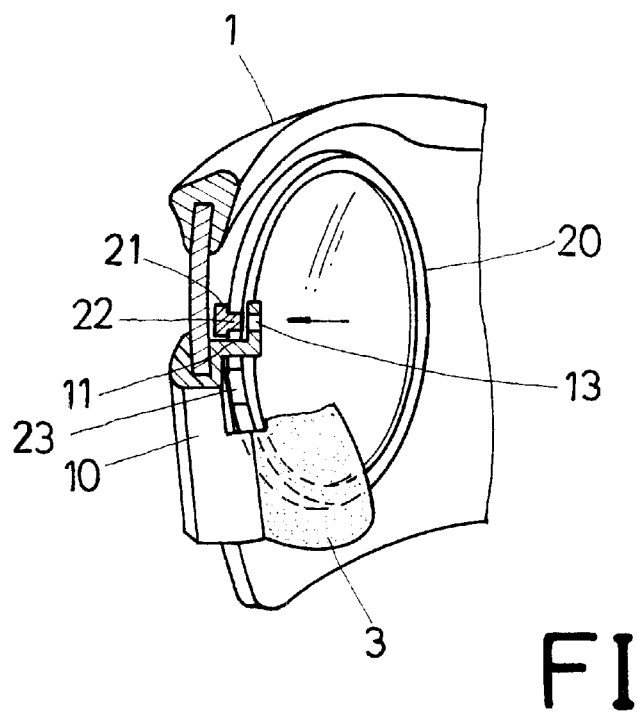

The combine member 11 includes a receiving portion 13a for receiving the near-sight eyeglasses 2. The receiving portion 13a includes the sidewise holes 13, and the receiving portion 13a is spaced apart from the sunglasses 1, as shown in FIGS. 3 and 4.

If a pair of eyeglasses with different degrees is to be used instead of a present one combined with the sunglasses, only press down a bit the intermediate portion of the old near-sight glasses, letting the bridge 21 elastically move in with the sidewise projections 22 of the bridge 21 also moving to separate from the holes 13 of the combine member 11 of the sunglasses. Then the old pair of near-sight eyeglasses may be taken down. In this way, a user can easily change a pair of near-sight eyeglasses to combine with the sunglasses. In addition, the two stop blocks 23 of the two lens rims 20 may rest on the nose pads 10 of the sunglasses 10 in case of the near-sight eyeglasses 1 being changed, preventing the lenses of the sunglasses 1 from broken or scarred by the near-sight eyeglasses 2 by excessive force in changing or assembling them, as shown in FIG. 4, due to the gap between the sunglasses and the near-sight eyeglasses.

The invention has the following advantages, as can be understood from the aforesaid description.

1. A user can assemble a pair of near-sight eyeglasses with the sunglasses with easiness and convenience.

2. Assembling or changing a pair of near-sight eyeglasses can be performed without any tool, and with quickness and stability.

3. Persons of myopia can use it when the sunlight is strong, having effect of two kinds of eyeglasses.

While the preferred embodiment of the invention has been described above, it will be recognized and understood that various modifications may be made therein and the appended claims are intended to cover all such modifications that may fall within the spirit and scope of the invention.

What is claimed is:

1. A pair of sunglasses in combination with a pair of new-sight eyeglasses wherein:

the pair of sunglasses comprise a combine member secured to a bridge-portion of the sunglasses, the combine member comprising a pair of nose pad receiving members, each of the nose pad receiving members including a pair of combine rods extending outwards away from the sunglasses, the combine member further comprising a receiving portion for receiving the near-sight eyeglasses, the receiving portion comprising a pair of sidewise holes, the receiving portion spaced apart from the sunglasses;

the near-sight eyeglasses comprising two lens rims, a bridge portion attaching the two lens rims, the bridge portion comprising two sidewise projections that extend outwards such that when the sidewise projection of the bridge portion are inserted into the sideways holes of the combine member, so that the near-sight eyeglasses are secured between the sunglasses and the combine member, the sunglasses and the near-sight eyeglasses are secured to one another; and a nose pad comprising holes that correspond to the combine rods, the nose pad secured to the combine member by attaching the holes of the nose pad to the combine rods of the combine member.

* * * * *